US007409033B2

United States Patent
Zhu et al.

(10) Patent No.: US 7,409,033 B2
(45) Date of Patent: Aug. 5, 2008

(54) TOMOGRAPHIC RECONSTRUCTION FOR X-RAY CONE-BEAM SCAN DATA

(75) Inventors: Lei Zhu, Stanford, CA (US); Rebecca Fahrig, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 11/557,441

(22) Filed: Nov. 7, 2006

(65) Prior Publication Data

US 2007/0297661 A1 Dec. 27, 2007

Related U.S. Application Data

(60) Provisional application No. 60/810,087, filed on May 31, 2006.

(51) Int. Cl.
G01N 23/00 (2006.01)

(52) U.S. Cl. .......................... 378/4; 382/131

(58) Field of Classification Search ............ 378/4–20, 378/901
See application file for complete search history.

(56) References Cited

U.S. PATENT DOCUMENTS

| 5,384,861 | A  | * | 1/1995  | Mattson et al. ............ 382/131 |
| 6,560,354 | B1 | * | 5/2003  | Maurer et al. ............. 382/131 |
| 2006/0067457 | A1 | * | 3/2006  | Zamyatin et al. ............ 378/4 |
| 2006/0109952 | A1 | * | 5/2006  | Chen ....................... 378/4 |
| 2006/0198491 | A1 | * | 9/2006  | Taguchi .................... 378/15 |
| 2006/0291611 | A1 | * | 12/2006 | Pack et al. .................. 378/4 |
| 2007/0036418 | A1 | * | 2/2007  | Pan et al. .................. 382/131 |

OTHER PUBLICATIONS

Zhu et al., A Backprojection-based Estimation Method for Reducing the Cone-beam Artifacts in Circular Trajectories, IEEE, 2007, pp. 836-839.*
Zhao et al., A Family of Analytic Algoritms for Cone-Beam CT, Developments in X-ray Tomography IV, SPIE, vol. 5535, pp. 318-328.*
Yu et al., Studies on Artifacts of the Katsevich Algorithm for Spiral Cone-beam CT, Developments in X-ray Tomography IV, SPIE, vol. 5535, pp. 540-549.*
Zhu et al., "Scatter Correction Method for X-Ray CT Using Primary Modulation: Theory and Preliminary Results", IEEE Trans. on Med. Imaging, vol. 25, No. 12, pp. 1573-1587, Dec. 2006.
Zhu et al., "Shift-invariant Cone Beam FBP Reconstruction on not Less than a Short Scan", World Congress on Medical Physics and Biomedical Engineering 1002 (WC 2006), Aug. 2006, Seoul, South Korea.
Feldkamp et al., "Practical Cone-Beam Algorithm", J. Opt. Soc. Am. A, vol. 1, No. 6, Jun. 1984.
Parker, "Optimal Short Scan Convolution Reconstruction for Fanbeam CT", Med. Phys. 9(2), Mar./Apr. 1982, pp. 254-257.

* cited by examiner

*Primary Examiner*—Courtney Thomas
*Assistant Examiner*—Alexander H Taningco
(74) *Attorney, Agent, or Firm*—Beyer Law Group LLP

(57) ABSTRACT

Disclosed is x-ray cone beam scan data reconstruction of an imaged object with a reconstruction algorithm using shift invariant filtering and backprojection with the maximum tomographic capability of a circular scan larger than p plus cone angle, when CB data is not truncated and data extrapolation is not allowed. The reconstruction scheme includes a conventional FDK reconstruction and a parallel reconstruction using differential back projection and 1D Hilbert transform to suppress the CB artifacts.

11 Claims, 9 Drawing Sheets

(a) The geometry of the real and hypothetical detectors.

(b) The projection on the hypothetical detector.

(c) The transformed tilted parallel projection.

(a) Divergent projection (b) The transformed parallel projection (a) Tilted parallel projection.

(b) Sampling pattern in the Fourier domain and the cone of missing data. The solid polygon is the sampled plane of one projection.

(c) Sampling pattern in the Fourier domain on plane $\omega_z = \omega_0$. The solid line corresponds to the sampled plane in (b).

(a) Full rotation ($R_f$).

region A: 0
region B: 2

(b) Less than full rotation ($R_l$).

region A: 0
region B: 2
region C: 1
region D: 1

(c) Less than full rotation, with Hilbert transform applied ($R_h$). The multiplication of $j$ is omitted.

region A: 0
region B: 0
region C: 1
region D: −1

(a) The geometry of the real and hypothetical detectors.

(b) The projection on the hypothetical detector.

(c) The transformed tilted parallel projection.

(a) $x = 128$, P-FDK (b) $x = 128$, equation (22)

(c) $y = 128$, P-FDK (d) $y = 128$, equation (22)

(e) $z = 80$, P-FDK (f) $z = 80$, equation (22)

(a) x = 128

(b) y = 128

(c) z = 80

(a) $x = 128$, P-FDK    (b) $x = 128$, equation (23)

(c) $y = 128$, P-FDK    (d) $y = 128$, equation (22)

(e) $z = 80$, P-FDK    (f) $z = 80$, equation (23)

(a) z = 128, P-FDK    (b) z = 128, equation (22)

(c) y = 128, P-FDK    (d) y = 128, equation (22)

(e) z = 80, P-FDK    (f) z = 80, equation (22)

TOMOGRAPHIC RECONSTRUCTION FOR X-RAY CONE-BEAM SCAN DATA

CROSS REFERENCE TO RELATED APPLICATIONS

This application claims the benefit of priority under 35 USC 119(e) to U.S. Provisional Application No. 60/810,087, filed May 31, 2006, which is incorporated herein by reference in it's entirety.

STATEMENT REGARDING FEDERALLY SPONSORED RESEARCH OR DEVELOPMENT

The U.S. Government has rights in the disclosed invention pursuant to NIH Grant No. EB093524 to Stanford University.

BACKGROUND OF THE INVENTION

The invention relates generally to medical imaging using X-ray computed tomography (CT), and more particularly the invention relates to reconstructing cone-beam x-ray scan data in tomographic imaging.

Computed tomography is an established medical technique for visualizing internal organs with high resolution. Both fan beams and cone beams (CB) of x-rays are employed in CT.

3D image reconstruction from circular CB data has been an active research field for the last two decades. While the exact reconstruction is achievable on the plane of the source trajectory (mid-plane) if the rotation angle is larger than $\pi$ plus cone angle, it is impossible outside this central plane (off-plane). Many approximate algorithms have been developed for a circular CB scan. The filtered-backprojection (FBP-based reconstruction, due to Feldkamp et al. (FDK), is by far the most popular algorithm mainly for its structure of one-dimensional (1D) shift-invariant filtering. Although developed heuristically as an extension of the exact fan-beam reconstruction, this algorithm is very close to the optimal in the sense of without data extrapolation. It, however, results in severe CB artifacts in the case of short scan, which is very attractive in many applications, such as in the current C-arm CT. In order to handle the data redundancy, a simple but empirical modification of FDK uses Parker's weighting (P-FDK), which is accurate only for the mid-plane. Unlike the FDK algorithm on a full scan, this algorithm is not the optimal even in the sense of without data extrapolation. Nonetheless, the structure of 1D shift-invariant feature (for computation efficiency), other researchers apply a mathematically exact algorithm to the short scan source trajectory. The derived algorithm, however, does not necessarily achieve the optimal reconstruction.

SUMMARY OF THE INVENTION

The present invention proposes use of a tomographic reconstruction algorithm using shift-invariant filtering and backprojection with the maximum tomographic capability of a circular scan larger than $\pi$ plus cone angle, when CB data is not truncated and data extrapolation is not allowed. The reconstruction scheme includes a conventional FDK reconstruction and a parallel reconstruction using differential backprojection and 1D Hilbert transform to suppress the CB artifacts. Numerical results compare the performances of P-FDK and our algorithm, and show that the algorithm outperforms P-FDK generally. The reconstructed quality on a short scan using our algorithm is comparable to that on a full scan using FDK, although the data acquisition is reduced almost by half. Reconstructions on simulated noisy data manifest the stability of our algorithm.

The invention and object and features thereof will be more readily apparent from the following detailed description and appended claims when taken with the drawings.

DETAILED DESCRIPTION OF ILLUSTRATIVE EMBODIMENTS

Data Acquisition Geometry

Consider first a mathematical description of the reconstruction problem, and two theorems that are important in our algorithm derivation. The conversion theorem from divergent projection to parallel projection provides a link between these two imaging geometries, and the FBP-based algorithm on a tilted parallel full scan gives the optimal reconstruction if projection data is not truncated and extrapolation is not allowed. A generalized version of the latter is also derived for later use.

Figure 1:
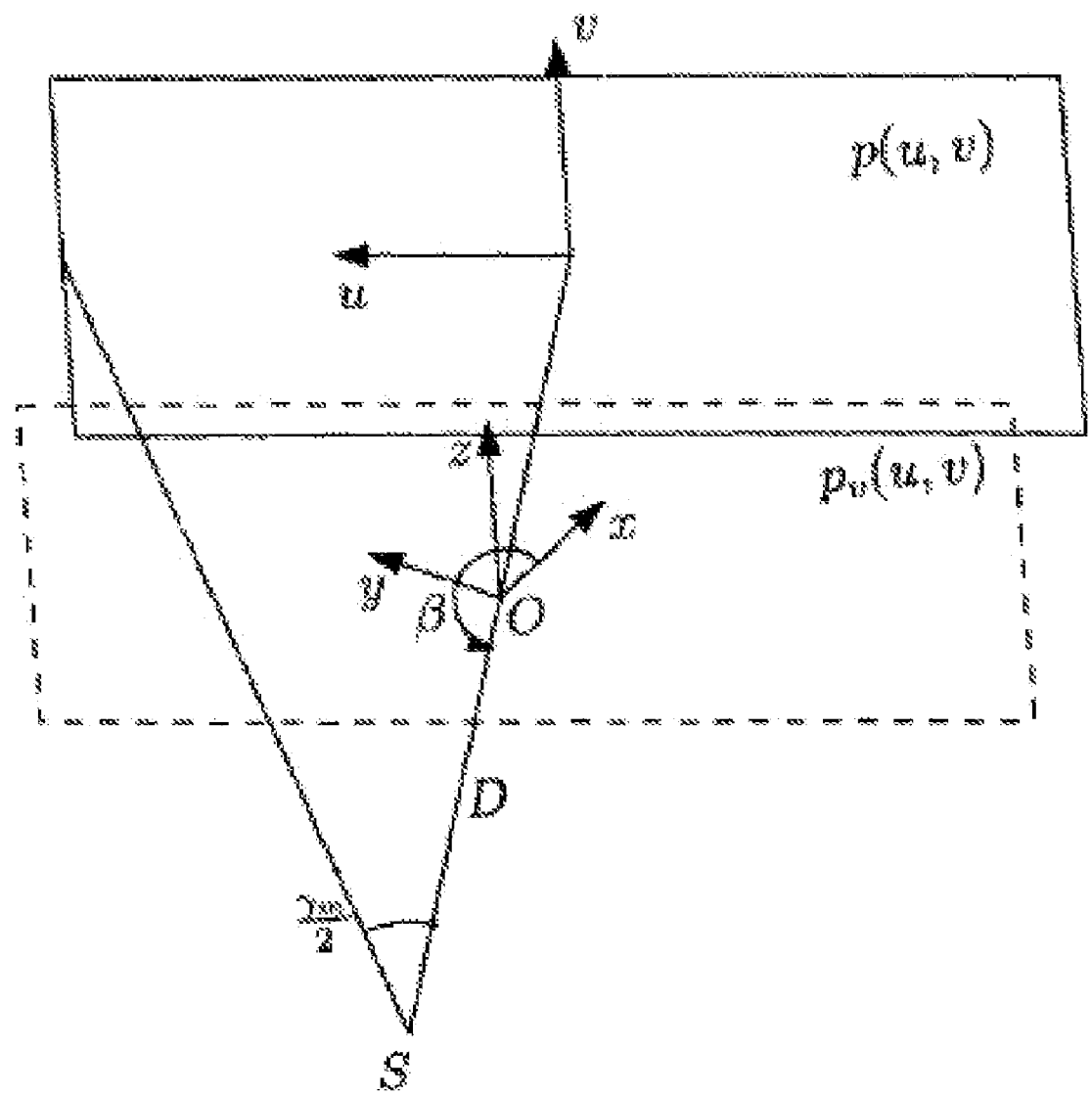
FIG. 1 illustrates a CB data acquisition geometry and coordinate system.

Herein, we use an equally spaced flat panel detector with a finite size. As shown in FIG. 1, The cone angle $\gamma_m$ of this imaging setup is determined by the maximum angular coverage of the cone-beam in the u direction on the detector. During data acquisition, the x-ray source S rotates along the z axis on the x-y plane, with a fixed distance D to the center of rotation O, and the rotation starts at angle $\beta_s$ and stops at $\beta_e$, with total rotation of not less than $\pi+\gamma_m$ ($|\beta_e-\beta_s|\geq\pi+\gamma_m$). The detector is placed perpendicular to SO for each projection. In the Cartesian coordinate system with the origin at O, the source position is:

$$\vec{s}(\beta)=(D\cos\beta, D\sin\beta, 0), \beta\in[\beta_s,\beta_e] \quad (1)$$

The object to be reconstructed is described by a nonnegative function $f(\vec{r})$, where $(\vec{r})=(x, y, z)$ is the Cartesian coordinate. It is also assumed that $f$ is compactly supported and that the CB detector covers the whole object from any view during data acquisition. In other words, there is no truncation of the projection data.

Denoting the distance from O to detector as $D_{od}$, then the relation between p(u, v, $\beta$), the real projection image and $p_v$(u, v, β), the image on a virtual detector that is parallel to the real detector and passes through O, is as follows:

$$p_v(u, v, \beta) = \left(\frac{D + D_{od}}{D}\right)^2 p\left(u\frac{D + D_{od}}{D}, v\frac{D + D_{od}}{D}, \beta\right) \quad (2)$$

For simplicity, we regard the virtual detector as the real detector, and reconstruct from $p_v$ hereafter. The subscript of $p_v$ is dropped without ambiguity.

The projection data on the detector are measured along two unit vectors in the Cartesian coordinate system, $\hat{e}_u(\beta)=(-\sin\beta, \cos\beta, 0)$ and $\hat{e}_v(\beta)=(0, 0, 1)$. The projection at angle on the detector is the set of half line integrals, written as:

$$p(u,v,\beta) = \int_0^\infty dl f(\vec{s}(\beta) + l\vec{r}_0(\beta)) \quad (3)$$

where $\vec{s}$ is the source position as defined in equation (1), and $\vec{r}_0$ is the unit vector of line integral direction, $$\vec{r}_0(\beta) = \frac{1}{\sqrt{u^2 + v^2 + D^2}}(u\hat{e}_u(\beta) + v\hat{e}_v(\beta) - \vec{s}(\beta)) \quad (4)$$

A Conversion Theorem from Divergent to Parallel Projections

The classic central slice theorem in 3D states that the Fourier transform of a 2D parallel projection image is the Fourier transform of the 3D object on the 2D slice that is normal to the projection direction. In parallel projection CT, it enables a simple analysis of the projection data plane by plane. This nice feature is lost in divergent projection CT, and in the reconstruction, either a rebinning step is involved or the projection data is analyzed using Radon transform theory.

Figure 2:
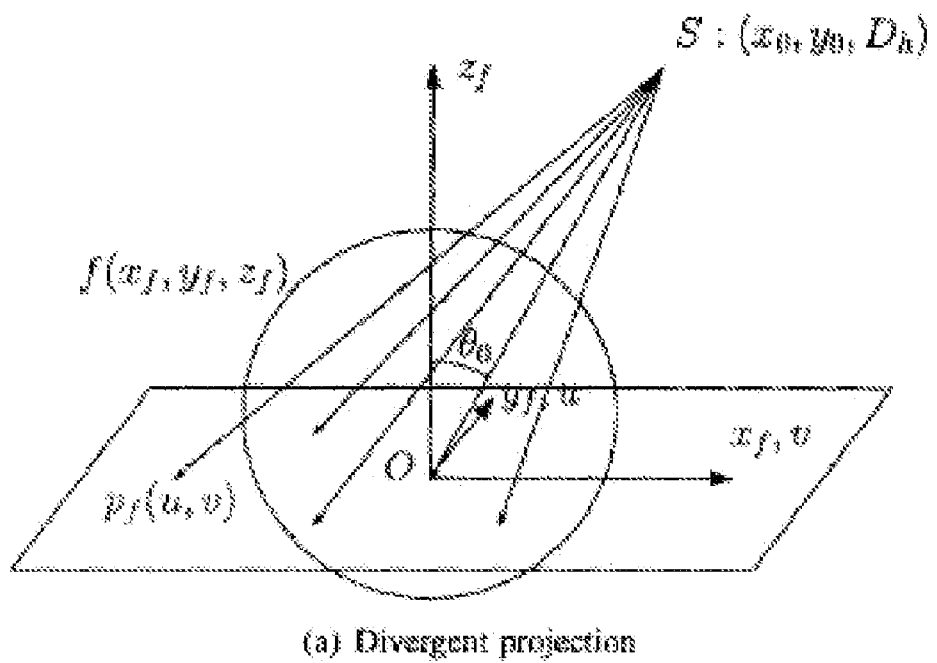
FIG. 2 illustrates the divergent to parallel conversion theorem.
Figure 2:
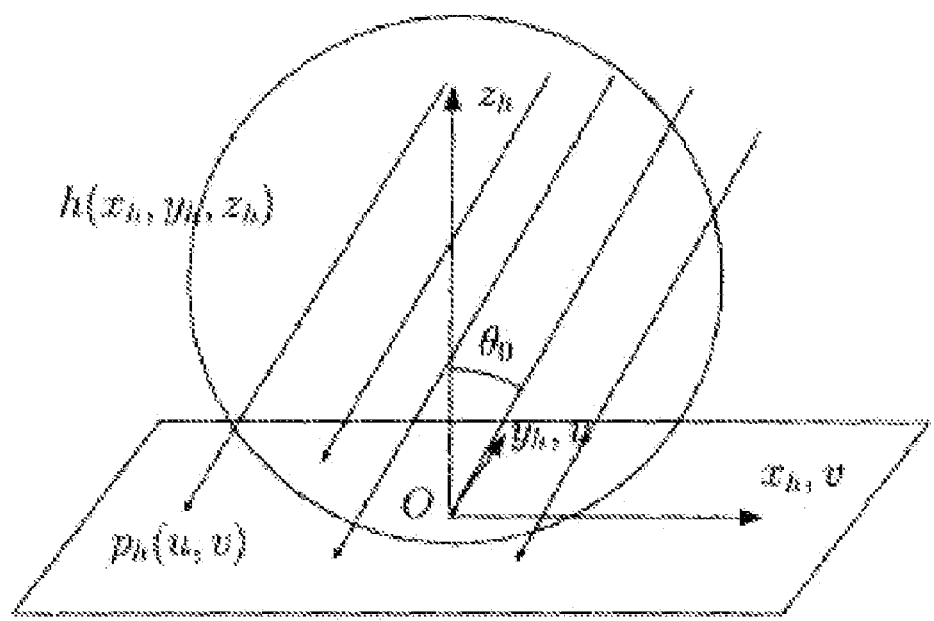

A relation between parallel and divergent projections has been described by Edholm et al., and is summarized below. As shown in FIG. 2, in the divergent projection, the x-ray source is located at $(x_0, y_0, D_h)$, and $p_f(u, v)$ is the divergent projection image on the plane z=0 through an object f. The origin is denoted O, and $\theta_0$ is the angle between $\overrightarrow{SO}$ and the z axis. Another projection image $p_h(u, v)$ is generated on the same plane from parallel rays through a hypothetical object h, and the parallel rays are parallel to the line $\overrightarrow{SO}$ in the divergent geometry. Let $\vec{r} = (x, y, z)$, then the following statement is true:

If the coordinate system of the parallel geometry is related to that of the divergent geometry as $$\vec{r}_h = \frac{D_h}{D_h - z_f}\vec{r}_f \quad (5)$$

and, the hypothetical object h is generated as a transformation of the real object f, given by $$h(\vec{r}_h) = \left(\frac{D_h - z_f}{D_h}\right)^2 f(\vec{r}_f) \quad (6)$$

then, we have:

$$p_h(u, v) = \frac{\cos\theta}{\cos\theta_0} p_f(u, v) \quad \text{where} \quad (7)$$

$$\frac{\cos\theta}{\cos\theta_0} = \left(\frac{x_0^2 + y_0^2 + D_h^2}{(v - x_0)^2 + (u - y_0)^2 + D_h^2}\right)^{1/2}$$

The intuition of this theorem is as follows. Since in a divergent projection geometry, each slice of the object that is parallel to the detector has a uniform magnification factor $$\left(\frac{D_h}{D_h - z_f}\right)$$

as in equation (5)), stretching the object can convert divergent rays of the projection to parallel rays. This theorem relates a divergent projection to a parallel projection via constructing a virtual object, and the classic central slice theorem then comes back into play in the Fourier domain of the virtual object.

However, for this theorem to be useful in CT reconstruction, it is required that the hypothetical object h is the same for each view. According to equations (5) and (6), an equivalent condition is that, the source to detector distance D is fixed during the data acquisition, and the rotation trajectory of the x-ray source and the detector is in a plane perpendicular to the $z_f$ axis. While this requirement is satisfied in some tomographic imaging geometries, such as tomosynthesis, it is not in the circular CB scan. Therefore, a novel approach using imaging geometry transformation is proposed to make Edholm's theorem applicable, as will be presented in section III.

A FBP-Based Reconstruction on a Tilted Parallel Circular Scan

Figure 3:
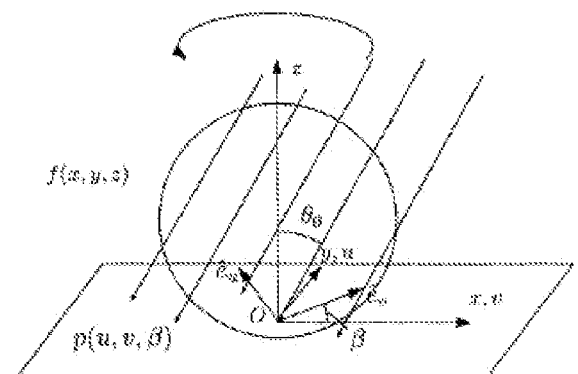
FIG. 3 illustrates the tilted parallel projection and its sampling pattern in the Fourier domain.
Figure 3:
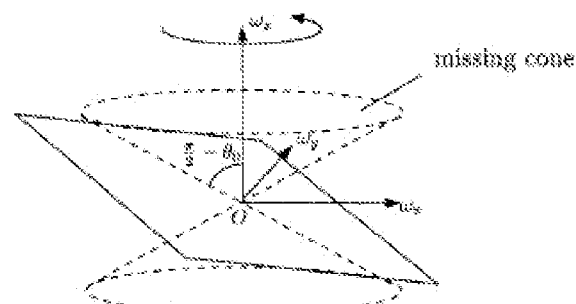
Figure 3:
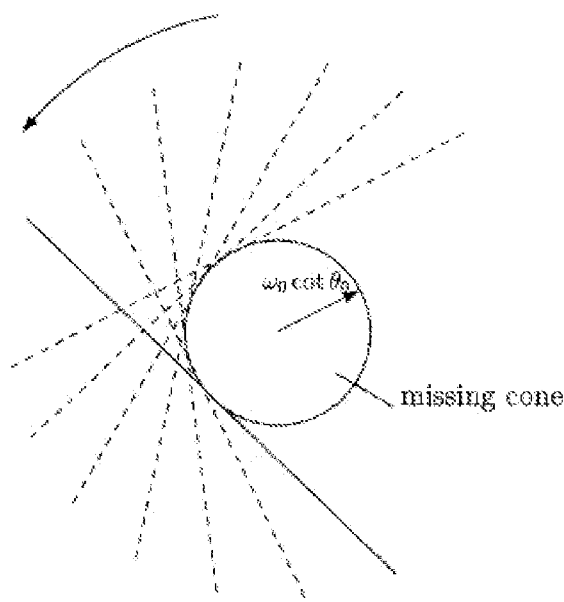

As will now be shown, our CB reconstruction algorithm is closely related to the reconstruction on a tilted parallel circular scan. In FIG. 3 we show the parallel projection in the image and Fourier domain with a tilting angle $\theta_0$ between the projection direction and the axis of rotation. The parallel projection data p(u, v, β) are measured along two unit vectors, $\hat{e}_u(\beta)=(-\sin\beta, \cos\beta, 0)$ and $\hat{e}_v(\beta)=(\cos\beta, \sin\beta, 0)$, on a flat detector. It is assumed that the detector is equally spaced. However, the derived formula also works for non-uniformly spaced detectors, except that the projection image would have to be multiplied by an additional term that compensates for the projection domain sampling density variation. According to the central slice theorem, the Fourier transform of each projection is the sampled slice of Fourier space data of the object that is perpendicular to the direction of projection. If the rotation angle is 2π, two cones of missing data appear in the Fourier domain as shown in FIG. 3(b).

Reconstruction on a full scan: AFBP-based reconstruction algorithm on a full scan has been developed by Pelc, without using data extrapolation. In this case, not using extrapolation is equivalent to assuming that the data inside the unsampled cones are zero. This algorithm is the same as the special non-tilted case when $$\theta_0 = \frac{\pi}{2},$$

except that an additional scaling term, sin $\theta_0$, is included in the ramp filter kernel $g_0(y)$, which comes from the oblique sampling along the z direction. The reconstruction formula is reviewed below:

$$\hat{f}(x, y, z) = \frac{1}{2}\int_0^{2\pi}\int_{-\infty}^{\infty} p(\bar{u}-u, \bar{v}, \beta)g(u)du d\beta \qquad (8)$$

where, $$\bar{u} = -\sin\beta x + \cos\beta y$$

$$\bar{v} = \cos\beta x + \sin\beta y + \tan\theta_0 z$$

$$g(u) = \sin\theta_0 g_0(u)$$

and $$g_0(u) = \int_{-W}^{W} |\omega| e^{j2\pi\omega u} d\omega.$$

W is the cut-off frequency that depends on the resolution of the projection image.

Figure 4:
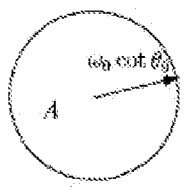
FIG. 4 illustrates the redundancy function on the plane of $\omega_z=\omega_0$, solid lines indicate the region boundaries.
Figure 4:
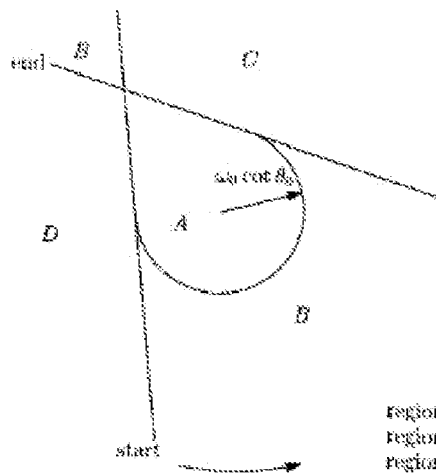
Figure 4:
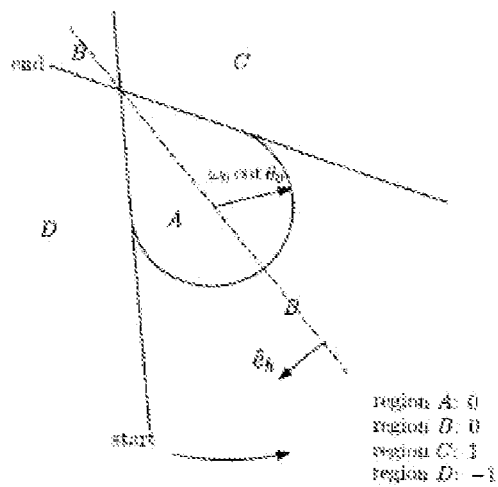

Reconstruction on less than a full scan: Two factors act jointly in the Fourier domain sampling pattern, the sampling density along the radial direction and the redundancy function. The redundancy function is defined as the effective number of times that a frequency sample in the Fourier domain contributes in the backprojection after ramp filtering. The above reconstruction scheme compensates for the sampling density variation along the radial direction using a ramp filter, but does not compensate for the redundancy function. The scheme works well on a full scan, since the redundancy function, $R_f$, is uniformly 2 outside of the missing cone and 0 inside. However, as illustrated in FIG. 4, less than a full scan results in a non-uniform redundancy function $R_l$, and the reconstruction is sub-optimal.

To generalize the reconstruction algorithm for less than a $2\pi$ rotation, one possibility is to incorporate the redundancy correction into the ramp filtering, and the 1D ramp filter becomes a 2D filter. However, restriction to 1D filtering is critical in our algorithm development, because of the conversion from divergent to parallel geometry, and we propose a novel reconstruction scheme that requires only 1D filtering.

Since the Hilbert transform reverses the sign of half of the input signal in the Fourier domain (besides the multiplication of j), taking the 1D Hilbert transform of the projection image along $\hat{e}_u$ after ramp filtering and before backprojection results in the redundancy function $R_h$ as shown in FIG. 4(c). The vector $\hat{e}_u$ is also the direction of the 1D ramp filtering (see FIG. 3(a)). The region that has double sampling in $R_l$ is where the signal cancellation occurs in $R_h$ (region B, in both FIG. 4(b) and FIG. 4(c)). Note that the sum of $|R_h|$ and $R_l$ is uniformly 2 outside the region of no samples (region A), as we desire. Taking the absolute value of $R_h$ can be done alternatively by, after backprojecting the Hilbert transformed projection images for all views, taking another 1D Hilbert transform on the reconstructed volume along the direction $$\hat{e}_h = \left(-\sin\left(\frac{\beta_s+\beta_e}{2}\right), \cos\left(\frac{\beta_s+\beta_e}{2}\right), 0\right)$$

in the 3D image domain. The sign of region C in $R_h$ is reversed, and the multiplication of j that is associated with the 1D Hilbert transform combines that of the previous Hilbert transform in the projection domain, and makes the resulting redundancy function positive real. Therefore, the generalized reconstruction formula can be written as:

$$\hat{f}(x, y, z) = \hat{f}_1(x, y, z) + H_{\frac{\beta_s+\beta_e}{2}}\hat{f}_2(x, y, z) \qquad (9)$$

where, $\beta_s$ and $\beta_e$ are the start and end angles, and operator $H\lambda$ is the Hilbert transform along the direction $\vec{r}_0 = (-\sin\lambda, \cos\lambda, 0)$. Let $\vec{r}_f = (x, y, z)$, $$g_h(u) = \frac{1}{\pi u}$$

is the kernel of Hilbert filter:

$$H_\lambda f(\vec{r}_f) = \int_{-\infty}^{\infty} f(\vec{r}_f - l\vec{r}_0) g_h(l) dl \qquad (10)$$

The function $\hat{f}_1$ is the reconstructed image using the formula as in the full scan, with the redundancy function $R_l$ uncompensated, $$\hat{f}_1(x, y, z) = \frac{1}{2}\int_{\beta_s}^{\beta_e}\int_{-\infty}^{\infty} p(\bar{u}-u, \bar{v}, \beta)\sin\theta_0 g_0(u) du d\beta \qquad (11)$$

Where $\bar{u}$, $\bar{v}$, and $g_0$ are defined as in (8).

The function $\hat{f}_2$ is the reconstructed image obtained by applying the 1D Hilbert transform before backprojection, with a redundancy function $R_h$, $$\hat{f}_2(x, y, z) = \frac{1}{2}\int_{\beta_s}^{\beta_e}\int_{-\infty}^{\infty} p(\bar{u}-u, \bar{v}, \beta)\sin\theta_0 g_{hr}(u) du d\beta \qquad (12)$$

where $g_{hr}$ is the convolution of the ramp filter kernel $g_0$ and the Hilbert kernel $g_h$:

$$g_{hr} = \int_{-\infty}^{\infty} \frac{g_0(u-l)}{\pi l} dl \qquad (13)$$

Since ramp-filtering and the Hilbert transform can be combined as taking the first derivative, the above formula can also be expressed more simply as:

$$\hat{f}_2(x, y, z) = \frac{1}{2}\int_{\beta_s}^{\beta_e} \sin\theta_0 \frac{\partial}{\partial u} p(u, \bar{v}, \beta)\bigg|_{\bar{u}} d\beta \qquad (14)$$

As the angle range $\beta_e-\beta_s$ increases, more cancellation occurs in $\hat{f}_2$; when $(\beta_e-\beta_s)=2\pi$, $\hat{f}_2$ cancels completely and equation (9) is reduced to equation (8).

Reconstruction on not Less than a Short Scan

According to Edholm's theorem, each divergent projection can be converted into a parallel projection by constructing a hypothetical object. However, converting the circular CB imaging geometry into circular parallel imaging requires that the hypothetical object is unchanged for each view. This is not true in the CB imaging setup. There is no 2D slice of the object where the magnification factor is uniform for all projection views, while this property is critical for the application of Edholm's divergent to parallel conversion theorem.

A system with the required constant magnification factor can be generated by re-casting the standard single-circle CB imaging trajectory. We construct a hypothetical detector on a plane that is below and parallel to the mid-plane, at a distance of $D_h$. The mid-plane divides the object into 3 parts: upper half, lower half and mid-plane. Now we consider the reconstruction of the lower half only. Every divergent ray emitted from the x-ray source intersects the hypothetical detector, as well as the real detector, if the virtual detector size is assumed to be infinite. Therefore, the divergent projection image on the hypothetical detector has a one-to-one mapping with the lower half of the projection image on the real detector. For the lower half of the object, a reconstruction using the CB data of the real detector is equivalent to that using the CB data of the hypothetical detector. Remove the real detector, and consider the imaging setup using the hypothetical detector. Now the same hypothetical object can be used for different views such that the conversion theorem is applicable, according to equation (6). This CB scan is converted to a tilted circular parallel scan, and the previously derived reconstruction algorithm can be applied. By summing up all of the system transformations, we can derive a circular CB reconstruction algorithm.

The main flow of the algorithm derivation becomes straightforward, and it consists of the following steps:

Find the equivalent CB projection image on the lower hypothetical detector from the lower half of the CB projection image on the real detector;

Convert the circular CB projection on the hypothetical detector into a tilted circular parallel projection, by constructing a hypothetical object;

Reconstruct the hypothetical object using the derived reconstruction algorithm on a tilted circular parallel scan;

Convert the reconstructed hypothetical object back to the real object;

Repeat this for reconstruction of the upper half of the object, and the reconstruction of the mid-plane can be done either using the existing exact fan-beam reconstruction formula, or as a limit case of the off-plane reconstruction.

Note, however, that these reconstruction steps only provide intuition and are used as a conceptual tool. The practical reconstruction scheme will be proposed based on a more compact reconstruction formula, as we will derive below.

The Mathematical Derivation

Figure 5:
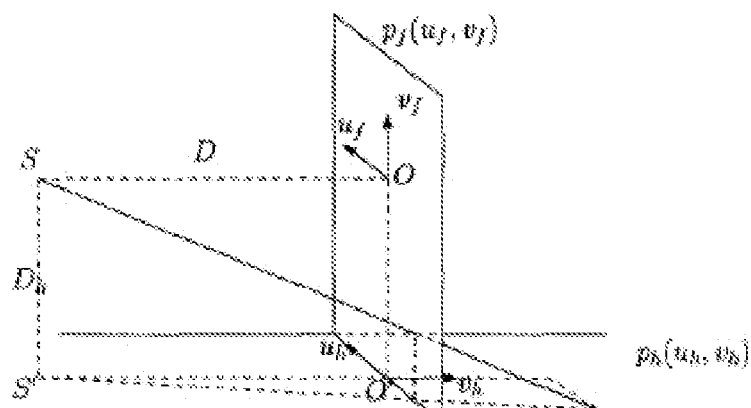
FIG. 5 illustrates the system geometry and the real and hypothetical coordinate systems.
Figure 5:
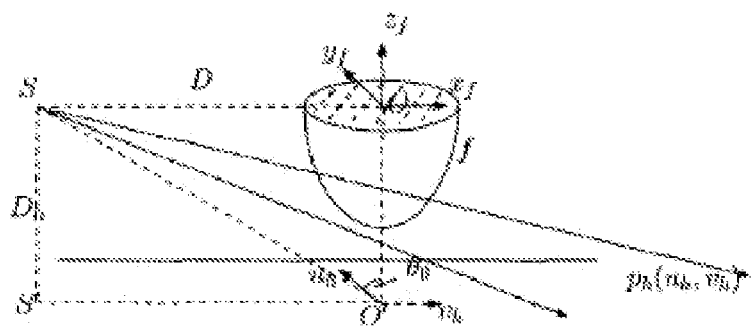
Figure 5:
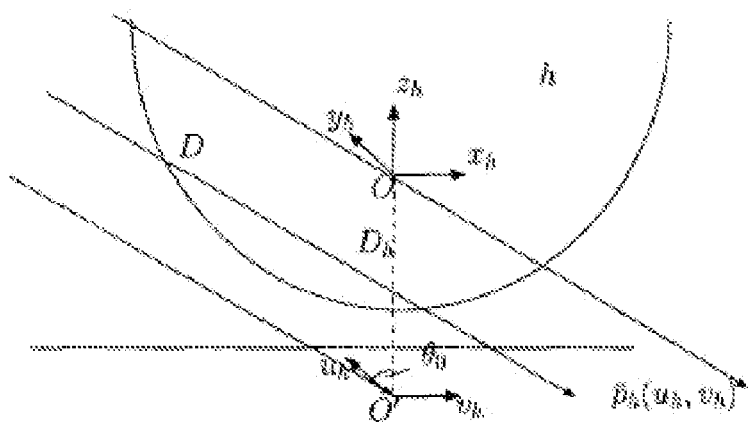

We first derive the algorithm for reconstruction of the lower half of the object. As shown in FIG. 5, the image on the real detector is $p_f(u_f, v_f)$ and the corresponding image on the hypothetical detector is $p_h(u_h, v_h)$. The parallel projection image on the hypothetical detector after the divergent to parallel conversion is denoted as $\bar{p}h(u_h, v_h)$. The object we try to reconstruct is $f(x_f, y_f, z_f)$ and its hypothetical object is $h(x_h, y_h, z_h)$. For clarity, the variables are used in a consistent way; variables x, y, z are the coordinates of the 3D image domain, while variables u, v are the coordinates of the 2D projection domain. Subscript f is used for the real object and detector, while subscript h is used for the hypothetical object and detector.

The relationship between $p_f(u_f, v_f)$ and $p_h(u_h, v_h)$ can be found based on the geometry shown in FIG. 5(a). Assume point $(u_f, v_f)$ on the real detector and point $(u_h, v_h)$ on the hypothetical detector are on the same ray emitting from the x-ray source S, then:

$$u_h = -\frac{u_f}{v_f} D_h, \quad v_h = -D\left(\frac{D_h}{v_f} + 1\right) \tag{15}$$

or, $$u_f = \frac{D u_h}{v_h + D}, \quad v_f = -\frac{D D_h}{v_h + D} \tag{16}$$

The Jacobian for variable change from $(u_f, v_f)$ to $(u_h, v_h)$ is $$J = \left\| \begin{array}{cc} \frac{D}{v_h + D} & -\frac{D u_h}{(v_h + D)^2} D \\ 0 & \frac{D D_h}{(v_h + D)^2} \end{array} \right\| = \frac{D^2 D_h}{(v_h + D)^3} \tag{17}$$

Note that $v_h > -D$, since $(u_f, v_f)$ and $(u_h, v_h)$ should be on the same side of the ray that emits from S, the absolute value in the Jacobian is dropped. Image $p_h$ can be obtained from $p_f$, with intensity adjustment by the Jacobian:

$$p_h(u_h, v_h) = p_f\left(\frac{D u_h}{v_h + D}, -\frac{D D_h}{v_h + D}\right) \frac{D^2 D_h}{(v_h + D)^3} \tag{18}$$

According to Edholm's theorem, this CB projection is equivalent to a tilted parallel projection with a tilting angle $$\theta_0 = \arctan \frac{D}{D_h}.$$

Note that the origins of the coordinate systems of the real and hypothetical objects are shifted vertically by $D_h$, as compared to those in the theorem derivation, and equations (5) and (6) need to be modified to include $D_h$ offsets on $z_h$ and $z_f$. Let $\vec{r} = (x, y, z)$ and $\hat{e}z = (0, 0, 1)$, the hypothetical object h is related to the real object f as:

$$f(\vec{r}_f) = \frac{D_h^2}{z_f^2} h\left(-\frac{D_h}{z_f}\vec{r}_f - \left(\frac{D_h}{z_f} + 1\right)D_h \hat{e}_z\right) \tag{19}$$

where, $$x_h = -\frac{D_h}{z_f} x_f \tag{20}$$

$$y_h = -\frac{D_h}{z_f} y_f$$

$$z_h = -\frac{D_h}{z_f}(z_f + D_h) - D_h$$

and $\bar{p}(u_h, v_h)$ can be computed as:

$$\bar{p}_h(u_h, v_h) = \frac{\cos\theta}{\cos\theta_0} p_h(u_h, v_h) \tag{21}$$

where,

-continued $$\cos\theta = \frac{D_h}{\sqrt{(v_h + D)^2 + u_h^2 + D_h^2}}$$

For simplicity, we use rotation angle $\beta=0$ in the above formula of $\overline{p}$, i.e., the x-ray source is located at $(-D, 0, D_h)$. The coordinate transformation of the rotation along the $z_f$ axis will be included in the final reconstruction formula. The hypothetical object is reconstructed by applying the reconstruction algorithm of tilted parallel projections (equation (9)). Note that, in the derivation of equation (9), it is assumed that the detector is equally spaced, while in a circular CB scan, the equally spaced real detector results in a hypothetical detector that is non-uniformly spaced. With the data sampling density change taken into account, the reconstruction algorithm of $\hat{h}$ should be applied on $$\frac{1}{J}\overline{p}_h.$$

Then the reconstructed real object is converted according to equation (19).

By combining equations (18), (21), (9) and (19), the final reconstruction formula is obtained as follows:

$$\hat{f}(x_f, y_f, z_f) = \quad (22)$$
$$\frac{1}{2}\int_{\beta_s}^{\beta_e}\left(\frac{D}{x_f+D}\right)_\beta^2 Q_1\left(\left(\frac{Dy_f}{x_f+D}\right)_\beta, \left(\frac{Dz_f}{x_f+D}\right)_\beta, \beta\right)d\beta +$$
$$H_{\frac{\beta_s+\beta_e}{2}}\left(\frac{1}{2}\int_{\beta_s}^{\beta_e}\left(\frac{D}{x_f+D}\right)_\beta^2 Q_2\left(\left(\frac{Dy_f}{x_f+D}\right)_\beta, \left(\frac{Dz_f}{x_f+D}\right)_\beta, \beta\right)d\beta\right)$$

where, operator H $$\frac{\beta_s + \beta_e}{2}$$

is the 1D Hilbert transform in the 3D image domain, along the direction $$\hat{e}_h = \left(-\sin\left(\frac{\beta_s+\beta_e}{2}\right), \cos\left(\frac{\beta_s+\beta_e}{2}\right), 0\right),$$

as defined by equation (10); and, $$Q_1(u_f, v_f, \beta) = \quad (23)$$
$$\int_{-\infty}^{\infty}\frac{D}{\sqrt{(u_f-u)^2+v_f^2+D^2}}p_f(u_f-u, v_f, \beta)g_0(u)du$$
$$Q_2(u_f, v_f, \beta) =$$
$$\int_{-\infty}^{\infty}\frac{D}{\sqrt{(u_f-u)^2+v_f^2+D^2}}p_f(u_f-u, v_f, \beta)g_{hr}(u)du$$

or,

-continued $$= \frac{\partial}{\partial u_f}\left(\frac{D}{\sqrt{u_f^2+v_f^2+D^2}}p_f(u_f, v_f, \beta)\right) \quad (24)$$

The subscript $\beta$ stands for the coordinate transformation of rotation along the $z_f$-axis by $\beta$; specifically, $$\left(\frac{D}{x_f+D}\right)_\beta = \frac{D}{\cos\beta x_f + \sin\beta y_f + D}$$

$$\left(\frac{Dy_f}{x_f+D}\right)_\beta = \frac{D(-\sin\beta x_f + \cos\beta y_f)}{\cos\beta x_f + \sin\beta y_f + D}$$

$$\left(\frac{Dz_f}{x_f+D}\right)_\beta = \frac{Dz_f}{\cos\beta x_f + \sin\beta y_f + D}$$

The derivation details are presented in the Appendix.

The upper part of the object can be reconstructed similarly, and the reconstruction formula is the same as above, by symmetry. Assuming the original object is continuous in $z_f$, the mid-plane reconstruction can be found by taking the limit as $z_f \to 0$ in the above formula, and it has the same form, since the reconstruction is also continuous in $z_f$. Equation (22) is therefore the final reconstruction formula for the whole object.

The first term of (22) is the conventional FDK reconstruction, and the second is a correction term that is reconstructed simultaneously to compensate for the non-uniformity of the redundancy function in the Fourier domain. This correction term is the 1D Hilbert transform of the reconstructed volume by differential backprojection (DBP). It has the same form of filtered backprojection as the first term except for a different filtering kernel, and it can be calculated efficiently. In a full scan $\beta_e - \beta_s = 2\pi$, only the first term survives, and the algorithm reduces to the FDK reconstruction.

The algorithm for redundancy compensation we proposed above using 1D filtering deserves a closer examination. In the image transformation from the projection on the real detector to that on the hypothetical detector, the shift-invariance property is preserved only along the u axis. Therefore, convolution in $u_f$ maps to convolution in $u_h$, while convolution in $v_f$ results in shift-variant filtering in $v_h$. For the efficiency and accuracy of reconstruction, it is important to restrict the filtering operation to only 1D along the u axis. Another way of understanding is that, the hypothetical detector of an equally spaced real detector is also equally spaced along the u axis, but very non-uniformly spaced along the v axis. The Fourier transform in u can still be done efficiently on the hypothetical detector, while the Fourier transform in v becomes a non-uniform Fourier transform, and very difficult to compute. Our proposed algorithm avoids the filtering in v naturally. One less desirable aspect of our approach is the slow decay of the Hilbert kernel, and special care must be taken in implementation as we will discuss later.

Reconstruction Scheme

Given equation (22), the practical reconstruction can be divided into the following steps:

Step 1: Weight the projection data $p_f(u_f, v_f)$ by $$\frac{D}{\sqrt{u_f^2 + v_f^2 + D^2}}.$$

$$p_w(u_f, v_f) = \frac{D}{\sqrt{u_f^2 + v_f^2 + D^2}} p_f(u_f, v_f) \quad (25)$$

Step 2.1: Convolve $p_w$ with a ramp filter kernel, $g_0$. Obtain $Q_1$ as in equation (23).
Step 2.2: Convolve $p_w$ with a ramp filter kernel and Hilbert kernel, $g_{hr}$; or, take the first derivative of $p_w$. Obtain $Q_2$ as in equation (24).
Step 3: Backproject $Q_1$, with intensity adjustment $$\left(\frac{D}{x_f + D}\right)^2_\beta$$

along the rays; backproject $Q_2$ in the same way to form a separate reconstructed object.

$$\hat{f}_i = \frac{1}{2} \int_{\beta_s}^{\beta_e} \left(\frac{D}{x_f + D}\right)^2_\beta Q_i\left(\left(\frac{Dy_f}{x_f + D}\right)_\beta, \left(\frac{Dz_f}{x_f + D}\right)_\beta, \beta\right) d\beta, \, i = 1, 2 \quad (26)$$

Step 4: Take the 1D Hilbert transform of $\hat{f}_2$ along $$\hat{e}_h = \left(-\sin\left(\frac{\beta_s + \beta_e}{2}\right), \cos\left(\frac{\beta_s + \beta_e}{2}\right), 0\right),$$

and add the result to $\hat{f}_1$ to form the final reconstructed object.

$$\hat{f} = \hat{f}_1 + H_{\frac{\beta_s + \beta_e}{2}}(\hat{f}_2) \quad (27)$$

Hilbert Transform

The slowly decaying behavior of the Hilbert kernel $$\frac{1}{\pi x}$$

will possibly result in inaccuracy in the reconstruction, and special care must be exercised in implementation.

Two 1D Hilbert transforms are used in this reconstruction algorithm, one in the 2D projection domain, and the other in the 3D image domain. The discrete implementation of the first one does not hurt the accuracy, since the projection data can be zero-padded before the convolution operation to make the finite integral very close to the infinite integral. Also, the Hilbert transform can be combined with the ramp filtering as a first derivative operation, which is a local filter and the slow decay problem disappears. The Hilbert transform in the 3D image domain, however, induces significant inaccuracy in the reconstruction. The reconstructed volume is finite, so only a finite length of data is available in the 1D Hilbert transform. On the other hand, mathematically, the reconstructed value before the Hilbert transform H $$\frac{\beta_s + \beta_e}{2}$$

is the 1D inverse Hilbert transform of an object $\hat{f}'_2$ whose transformed hypothetical object has some data missing in the Fourier domain. Since such an object $\hat{f}'_2$ is not compactly supported, the exact finite Hilbert transform as used in [14] and [15] is not applicable. If the discrete Hilbert transform is used with zero-padding as an approximation to the infinite Hilbert transform, the data truncation in the image domain results in severe artifacts in the nearby region, and the error decays as $$\frac{1}{l},$$

where l is the distance from the reconstructed voxel to the truncated edge.

It is uncertain whether an exact finite Hilbert transform exists for our situation, or whether it can be used efficiently. We therefore continue to use the discrete Hilbert transform with zero-padding, and combat the induced artifacts by extending the reconstructed volume in the direction of the Hilbert transform. As a result, the artifacts are greatly reduced, although the total reconstruction time increases accordingly. Denote the extension ratio by K. Since the reconstructed volume is only extended in the second term of equation (22) and DBP has the same structure as in the first FDK term, the reconstruction time increases by a factor of ~ K. If a large extension of the reconstructed volume is used, the residual artifacts are mostly low frequency, and the DC shift can be estimated and corrected from the fact that the voxel value outside the object is known to be zero. Ideally, the larger K becomes, the less artifacts appear in the reconstruction. However, three factors restrict K from getting too large. The first is the cost of reconstruction time. The second is the increase of view aliasing artifacts. Since the image domain sample spacing increases linearly with the distance from the voxel to the center of rotation, the angular sampling rate also becomes insufficient if the total number of views are fixed. The third factor is due to the divergent imaging setup. The density correction term $$\left(\frac{D}{x_f + D}\right)^2_\beta$$

in the reconstruction algorithm increases as the reconstructed voxel gets close to the x-ray source, and the reconstruction becomes more error-prone (the extreme case is the reconstructed volume contains the x-ray source). Even with these restrictions, simulation results show the artifacts can be suppressed effectively by proper choice of K.

The details of the Hilbert transform implementation and its related artifacts reduction techniques will be presented hereinbelow.

Data Sufficiency and Reconstruction Optimality

The reconstruction algorithm was developed by first analyzing the sampling pattern of the CB projection data in the Fourier domain of the transformed hypothetical object, then compensating for the sampling density non-uniformity by filtering, and finally backprojecting. This reconstruction scheme uses all of the information in the Fourier domain region that are sampled by the CB projection, while the unsampled region is left as zeros and does not affect the reconstructed object. Under the condition that data extrapolation is not allowed, it seems that this algorithm exploits the maximum tomographic capability of a circular CB scan trajectory. Note that an analytical study of the noise properties of the algorithm is not included in the present study, and the previous arguments are under the noise-free conditions.

An additional detail of importance is that, however, the interpretation of the sampling pattern is in the Fourier domain of the whole object, and the above argument is true only if the region of interest (ROI) is the whole reconstructed volume. On the mid-plane, when data is insufficient for exact reconstruction, for example in a super-short scan with a rotation angle of less than $\pi$ plus cone angle, it is more desirable that only the region with sufficient data is reconstructed exactly, while other regions might have large artifacts that are not of concern. Using the algorithm proposed here the best reconstruction for the whole object is achieved, but not necessarily for the small ROI. If the ROI is the whole object, it usually requires that the rotation angle is not less than $\pi$ plus cone angle, since only with this condition, exact reconstruction of the whole mid-plane is possible.

On the other hand, due to Tuy's sufficiency condition, we know that the reconstruction for all the voxels on the off-planes cannot be exact. A reasonable concern is that the optimality of the mid-plane reconstruction (exact reconstruction when data is sufficient) might be sacrificed in order to improve the off-plane reconstruction for the global optimality. Note, however, that the 1D filtering feature of the proposed algorithm makes the reconstruction of the mid-plane and offplanes uncorrelated, thus the optimum reconstructions are also achieved separately. Therefore, when data is sufficient for midplane reconstruction, the algorithm reconstructs the mid-plane exactly.

Summarizing the above, we conclude that if the projection data is not truncated and if no data extrapolation is allowed, our reconstruction scheme achieves the optimal reconstruction when rotation angle is not less than $\pi$ plus cone angle.

Numerical Results

We now present several numerical results to illustrate the performance of our reconstruction algorithm. The reconstruction on a short scan is compared with that on a full scan using the FDK algorithm and that on a short scan using the modified FDK algorithm with Parker's weighting. Although we only focus on the short scan case, similar results can be found using a larger rotation angle.

We use two simulated 3D phantoms, with projections computed analytically to avoid discretization error in the forward projection. One is a modified Shepp-Logan phantom that has high-contrast objects inside to emphasize the cone-beam artifacts in the reconstruction. The other is the conventional low-contrast Shepp-Logan phantom that is used to investigate reconstruction accuracy. Simulated poisson noise is also added in the projection images of the low contrast Shepp-Logan phantom to test the algorithm stability, and the noise level is chosen reasonably to match a clinical head scan.

Although our reconstruction scheme is not restricted to specific tomographic imaging geometries, we chose system parameters to model C-arm CT, on which the full scan mode is not available currently.

Implementation Details

The system parameters are summarized in Table I. As defined in III-C, K is the extension ratio of the reconstructed volume of the second term in equation (22) as compared to that of the first term, in the direction of the $H_\lambda$ operation. Only the center part of the reconstructed volume of the second correction term was extracted and added to the reconstructed volume of the first term, to form the final result. Using the system geometry as shown in FIG. 1, in the short scan mode, the gantry rotated clockwise from $\beta_s=280$ deg to $\beta_e=80$ deg, with the total rotation angle $\beta_m=200$ deg. Correspondingly, the final 1D Hilbert transform step was taken along the $-y$ direction, i.e. $H_\pi$.

TABLE I

SIMULATION AND RECONSTRUCTION PARAMETERS

| | |
|---|---|
| Source to image distance (SID) | 1150 mm |
| Source to axis distance (SAD) | 750 mm |
| Detector size | 512 × 512 |
| Pitch ($\Delta u$, $\Delta v$) | 0.78125 mm |
| Cone angle ($\gamma m$) | 20 deg |
| Projection number of full scan ($N_f$) | 800 |
| Projection number of short scan ($N_s$) | 444 |
| Reconstructed volume | 256 × 256 × 256 |
| Reconstructed voxel size ($\Delta x$, $\Delta y$, $\Delta z$) | 0.78125 mm |
| Volume extension ratio (K) | 4 |

In the calculation of $Q_2$, we chose to use the first derivative operation instead of convolving pw with the kernel $g_{h_r}$. The derivative with respect to u was computed using the 2-point formula:

$$\frac{\partial}{\partial u_f} p(u_f, v_f, \beta) \simeq \frac{p(u_f + \Delta u, v_f, \beta) - p(u_f - \Delta u, v_f, \beta)}{2\Delta u} \quad (28)$$

The 1D Hilbert transform $H\pi$ on the image was applied in the Fourier domain using the apodization window of Hamming at the Nyquist frequency. The DC shifts due to the finite length of the available data were first estimated line by line from the mid-plane reconstruction, by averaging the first and last 8 voxels on the final reconstructed mid-plane along the direction of the Hilbert transform. If the reconstruction was exact, we would expect these voxels to be zero. The whole reconstructed volume was then corrected using the same DC shift map as on the mid-plane for all of the x-y planes along the z axis.

The Shepp-Logan Phantoms

The numerical parameters of the 3D Shepp-Logan phantoms are based on [16], and listed in Table II for reference. The parameter $l_x$ ($l_y$, $l_z$) is the x (y, z) axis length of the ellipsoid, and $\delta x$ ($\delta y$, $\delta z$) is the offset of the center in x, both in mm. Angle $\theta$ is the rotation angle in degrees along the z axis. The parameter $\mu_h(\mu_l)$ is the attenuation coefficient of the high (low) contrast phantom object, in $mm^{-1}$.

TABLE II

NUMERICAL PARAMETERS FOR SHEPP-LOGAN PHANTOMS

| $l_x$ | $l_y$ | $l_z$ | $\delta x$ | $\delta y$ | $\delta z$ | $\theta$ | $\mu h$ | $\mu l$ |
|---|---|---|---|---|---|---|---|---|
| 0 | 0 | 0 | 69.0 | 92.0 | 90.0 | 0 | 2.00 | 2.00 |
| 0 | −1.84 | 0 | 66.2 | 87.4 | 88.0 | 0 | −1.00 | −0.98 |
| −22.0 | 0 | −25.0 | 41.0 | 16.0 | 21.0 | −72.0 | −1.00 | −0.02 |
| 22.0 | 0 | −25.0 | 31.0 | 11.0 | 22.0 | 72.0 | −1.00 | −0.02 |
| 0 | 35.0 | −25.0 | 21.0 | 25.0 | 35.0 | 0 | 0.50 | 0.01 |
| 0 | 10.0 | −25.0 | 4.60 | 4.60 | 4.60 | 0 | 0.50 | 0.01 |
| −8.00 | −60.5 | −25.0 | 4.60 | 2.30 | 2.00 | 0 | 0.50 | 0.01 |
| 6.00 | −60.5 | −25.0 | 4.60 | 2.30 | 2.00 | −90.0 | 0.50 | 0.01 |
| 6.00 | −10.5 | 6.25 | 5.60 | 4.00 | 10.0 | −90.0 | 0.50 | 0.02 |
| 0 | 10.0 | 6.25 | 5.60 | 5.60 | 10.0 | 0 | −1.00 | −0.02 |
| 0 | −10.0 | −25.0 | 4.60 | 4.60 | 4.60 | 0 | 0.50 | 0.01 |
| 0 | −60.5 | −25.0 | 2.30 | 2.30 | 2.30 | 0 | 0.50 | 0.01 |

Reconstruction of the High Contrast Phantom

Figure 6:
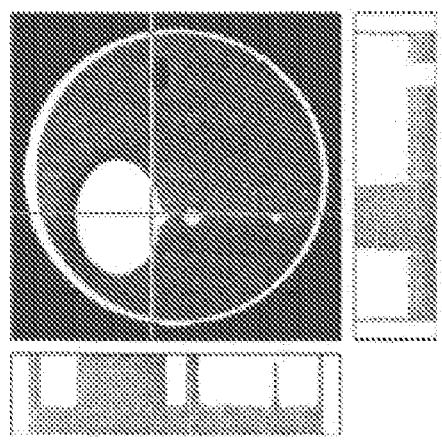
FIG. 6 illustrates the reconstruction of the modified high-contrast Shepp-Logan phantom on a short scan. Left column: using modified FDK with Parker's weighting; Right column: using equation (22). The thin lines on the image indicate the location that the 1D profiles are taken.
Figure 6:
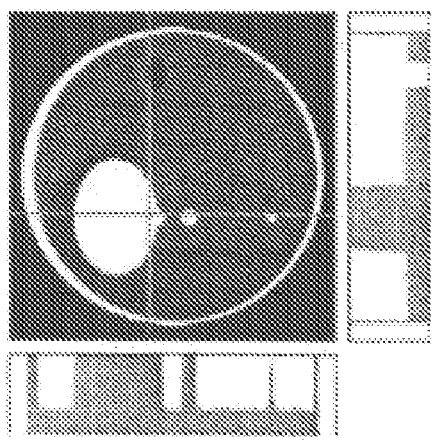
Figure 6:
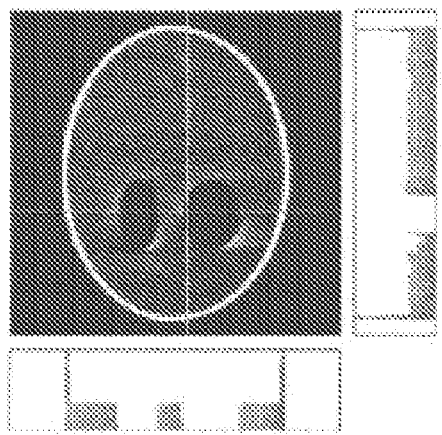
Figure 6:
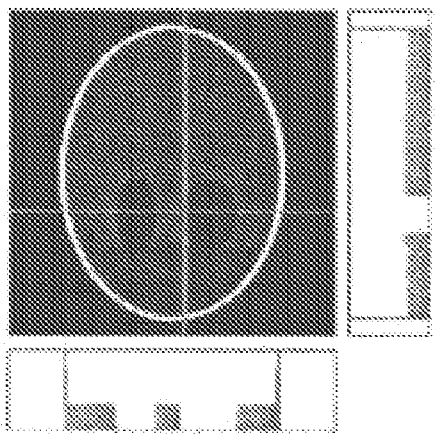
Figure 6:
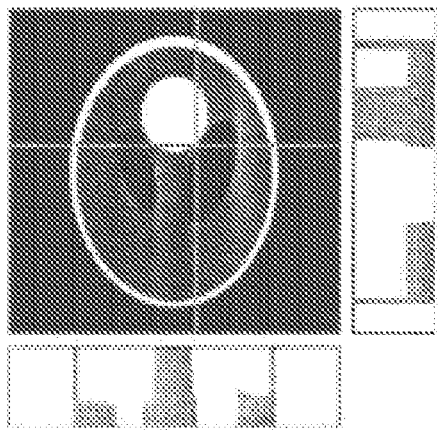
Figure 6:
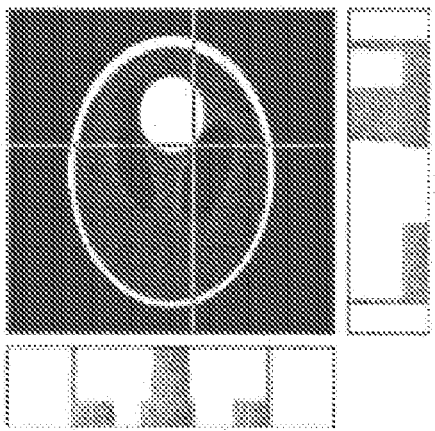
Figure 7:
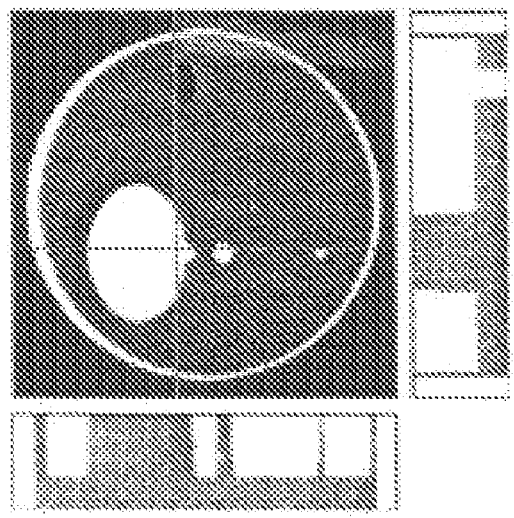
FIG. 7 illustrates the reconstruction of the modified high-contrast Shepp-Logan phantom on a full scan, using FDK algorithm.
Figure 7:
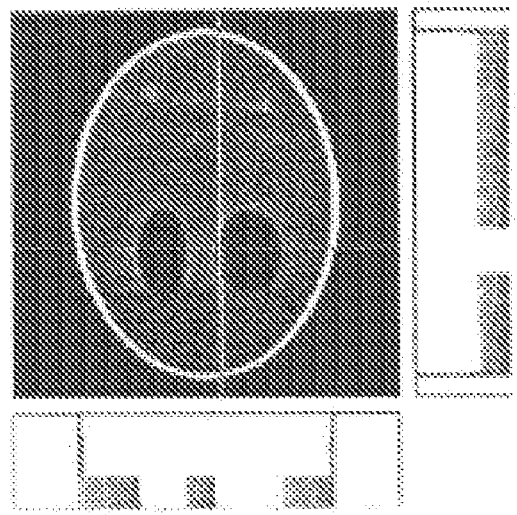
Figure 7:
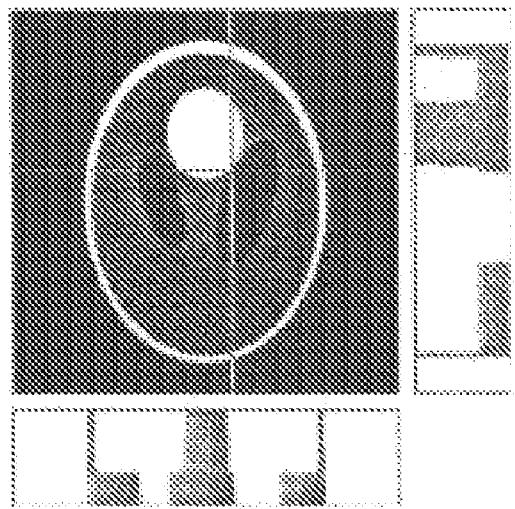

FIG. 6 compares the reconstructions of the high contrast phantom on a short scan, using the modified FDK algorithm with Parker's weighting (P-FDK) and our algorithm, equation (22). The left column shows that P-FDK results in severe CB artifacts on off-planes, especially around sharp transitions. These artifacts are greatly suppressed in the right column, where our algorithm is applied. Residual CB artifacts are mostly around sharp transitions in the z direction, due to the condition that extrapolation for the missing Fourier space data is not allowed. Although FIG. 6(a) is comparable to FIG. 6(b), the reconstructions along the other two directions show that our algorithm outperforms P-FDK algorithm on overall image quality. Also note that a relatively small cone angle (20 deg) is used in the simulations. If a larger cone angle is used, more CB artifacts will appear in the reconstruction using P-FDK, and more artifact reduction should be obtained by using our algorithm. Reconstruction using the FDK algorithm on a full scan is also presented in FIG. 7 as a reference. Our algorithm on a short scan has similar performance to the FDK algorithm on a full scan, although less data is acquired.

Reconstruction of the Low Contrast Phantom

Figure 8:
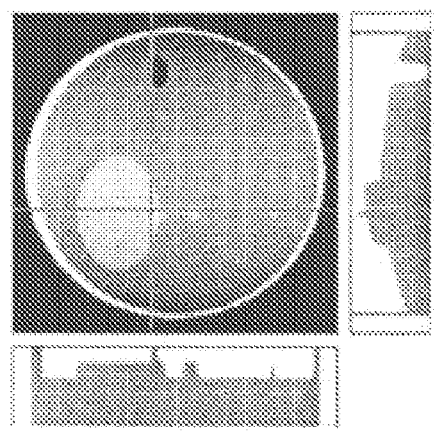
FIG. 8 illustrates the noise-free reconstruction of the low-contrast Shepp-Logan phantom on a short scan. Left column: using modified FDK with Parker's weighting; Right column: using equation (22).
Figure 8:
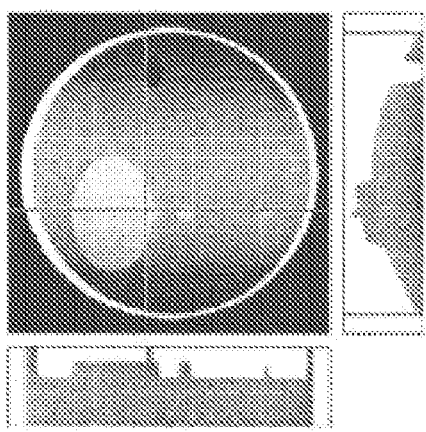
Figure 8:
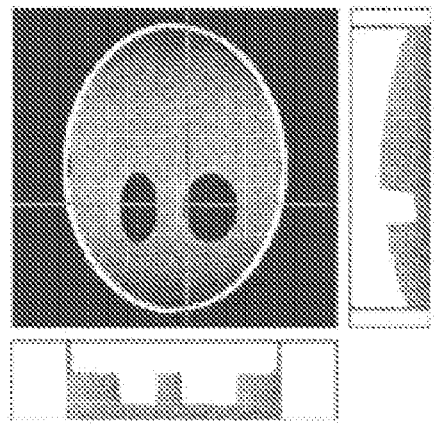
Figure 8:
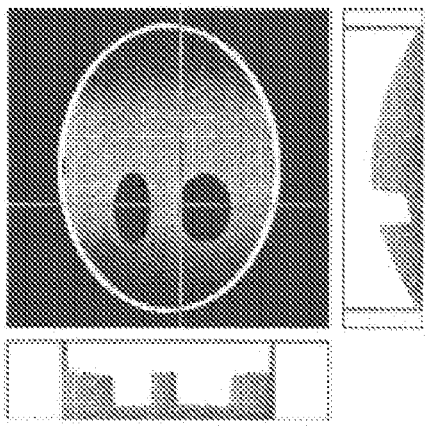
Figure 8:
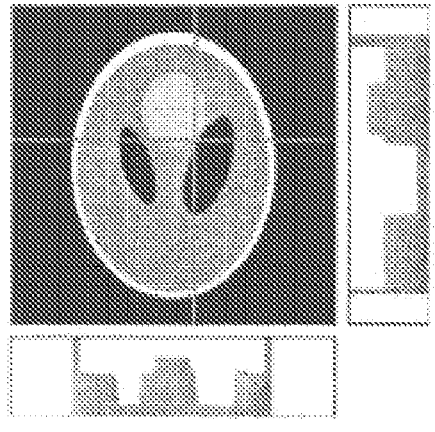
Figure 8:
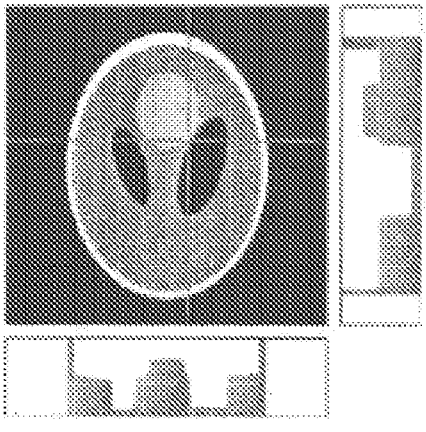

The noise-free reconstructions of the low contrast phantom are shown in FIG. 8. The images are displayed with a very compressed window to focus on the reconstruction accuracy. The magnitude of transition is much reduced in this phantom, therefore CB artifacts are not very obvious in the reconstruction using the P-FDK algorithm, and the well known uniformity drop along the z direction is due to the data insufficiency. By equation (22), the images are reconstructed quite accurately, while the uniformity drop is enhanced. Similar results have also been found by other researchers [6], and these artifacts are believed to be due to the missing data in the Fourier domain. As compared to the reconstruction by P-FDK, images using equation (22) also have some streak and ring artifacts, which are induced by the 1D Hilbert transform and view aliasing, as discussed above.

Figure 9:
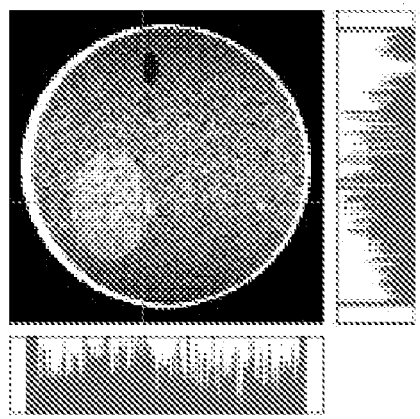
FIG. 9 illustrates the reconstruction of the low-contrast Shepp-Logan phantom on a short scan.
Figure 9:
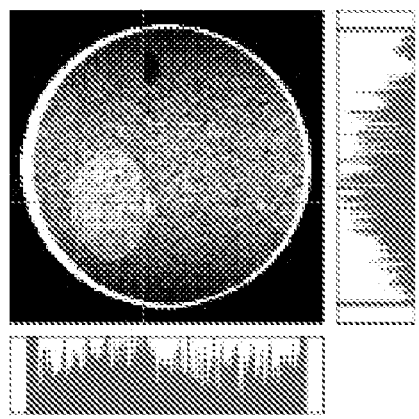
Figure 9:
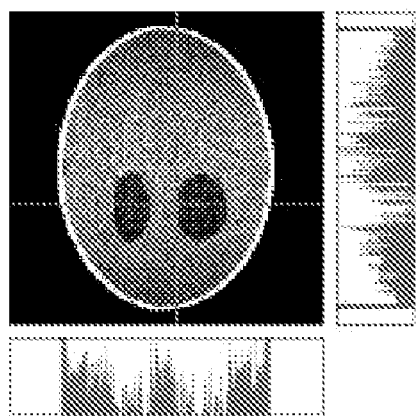
Figure 9:
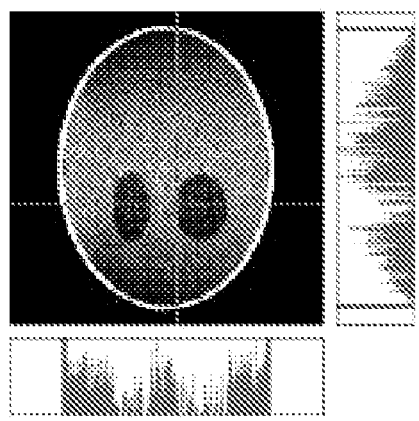
Figure 9:
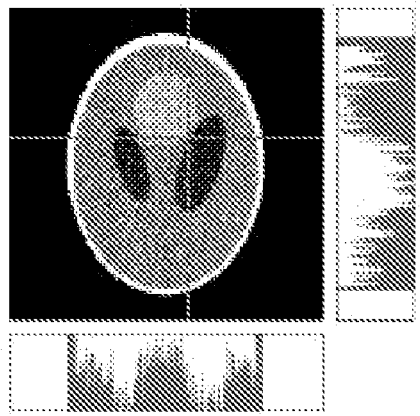
Figure 9:
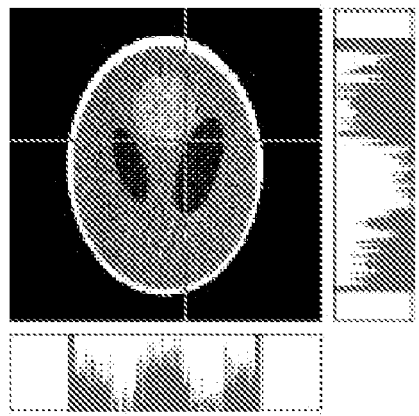

To test the algorithm stability, we also generated reconstructions from noisy projection images. To match the statistics of a clinical head scan, the noise is simulated as poisson noise with 300,000 photons per ray, and the value 1 in the phantom is modeled as water at 80 keV. The attenuation coefficient $\mu_l$ is multiplied by 0.01837 (0.01837 mm$^{-1}$ is the attenuation coefficient of water for 80 keV) when calculating photon counts at the detector. FIG. 9 shows that P-FDK and equation (22) are statistically similar in reconstruction performance. The noise in the reconstructed volume is measured by considering the reconstructions in FIG. 8 to be the true values, and subtracting them from the corresponding voxel values in FIG. 9. Using the P-FDK algorithm, the variance of noise in the center ROI (the middle half in all the x, y and z directions) is $7.0988 \times 10^5$, while it is $6.0353 \times 10^{-5}$ using equation (22). We believe the better noise property of our algorithm comes from the equal weighting scheme, although it has not been theoretically proven. Furthermore, in the reconstruction using equation (22), the streak and ring artifacts are overwhelmed by statistical noise and cannot be easily seen.

CONCLUSIONS

We have presented a FBP-based reconstruction algorithm from CB data on not less than a short scan. The reconstruction formula consists of a conventional FDK reconstruction and a correction term that applies the 1D Hilbert transform on an object reconstructed by DBP. The readers might notice that this correction term is very similar to the 2-step reconstruction algorithm on 2D images that was recently introduced by Noo et al. [14]. However it is derived based on a different concept and used for a different purpose here.

Since DBP has the same FBP-based form as the conventional FDK algorithm and only 1D shift-invariant filtering is used in the computation, the proposed reconstruction can be done efficiently. As compared to the conventional FDK reconstruction, the computation time increases by a factor of ~K, where K is the reconstructed volume extension ratio along the direction of the final 1D Hilbert transform, as defined in the paper. K needs to be chosen properly (4 in our implementations) for suppression of inaccuracy in the Hilbert transform.

This algorithm is derived from a Fourier domain analysis, and makes the best use of acquired data. Therefore, the reconstruction is optimal, under the condition that the projection is not truncated, data extrapolation is not allowed and the ROI is the whole volume. The last condition usually requires the scan rotation is not less than $\pi$ plus cone angle in practice. Simulation results of a modified high contrast Shepp-Logan phantom on a short scan show that this algorithm is able to greatly suppress the CB artifacts, as compared to the modified FDK algorithm with Parker's weighting. Simulations using the low contrast Shepp-Logan phantom with and without noise also demonstrates that the image is reconstructed accurately and stably, with improved noise properties. The Hilbert transform induced artifacts do not degrade the image quality when noise is present.

The algorithm presented herein is attractive from a practical point of view. For a circular scan with rotation less than $2\pi$ but larger than $\pi$ plus cone angle, it should improve the image quality, as compared to other conventional reconstruction algorithms. Finally, we derived our algorithm by converting the divergent projection to a parallel projection, and then using the classic central slice theorem. This unique perspective is applicable in other scenarios where the x-ray source is kept on a fixed plane during the data acquisition. It might be also useful in the reconstruction algorithm derivation of the scans in those acquisition geometries.

While the invention has been described with reference to specific embodiments, the description is illustrative of the invention and is not to be construed as limiting the invention. Various modifications and applications may occur to those skilled in the art without departing from the spirit and scope of the invention as defined by the appended claims.

APPENDIX I

Derivation of Equation (22)

Applying the reconstruction algorithm for a tilted parallel circular scan (equation (9)) on $$\frac{1}{J}\overline{p}_h,$$

we have the reconstructive hypothetical object:

$$\hat{h}(x_h, y_h, z_h) = \hat{h}_1(x_h, y_h, z_h) + H_{\frac{\beta_s+\beta_e}{2}} \hat{h}_2(x_h, y_h, z_h) \quad (29)$$

where $$\hat{h}_1 = \frac{1}{2}\int_{\beta_s}^{\beta_e}\int_{-\infty}^{\infty}\frac{1}{J}\overline{p}(u_h - u, v_h)\sin\theta_0 g_0(u)du d\beta \quad (30)$$

$$\hat{h}_2 = \frac{1}{2}\int_{\beta_s}^{\beta_e}\int_{-\infty}^{\infty}\frac{1}{J}\overline{p}(u_h - u, v_h)\sin\theta_0 g_{hr}(u)du d\beta \quad (31)$$

$$u_h = -\sin\beta x_h + \cos\beta y_h \quad (32)$$

$$v_h = \cos\beta x_h + \sin\beta y_h + \tan\theta_0(z_h + D_h) \quad (33)$$

Note that the coordinate system of the hypothetical object is shifted in $z_h$ direction by $D_h$ as compared to that used in equation (8), and offset $D_h$ on $z_h$ must be included in equation (33).

Convolution kernals $g$ and $g_{hr}$, and variables $\beta$, $\beta_s$ and $\beta_e$ are as defined previously. Operator $H_\lambda$ is defined as in equation (10).

The final reconstructed object $\hat{f}$ can be converted from $\hat{h}$ using equations (19) and (20). Denoting this conversion operation as T, due to linearity, we have:

$$\hat{f} = T(\hat{h}_1) + T\left(H_{\frac{\beta_s+\beta_e}{2}}(\hat{h}_2)\right) \quad (34)$$

Denote the Hilbert transform as H. for a function $q(x)$, we have:

$$H(q(ax)) = Hq(y)|_{y=ax}, a \in \mathfrak{R} \quad (35)$$

The above equation shows that scaling the variable before the Hilbert transform is equivalent to scaling after application of the transform. The proof is straightforward, and it is omitted here.

Note that for a fixed $z_f$, operation T is just scaling the variables $x_f$ and $y_f$, and Hilbert transform $$H_{\frac{\beta_s+\beta_e}{2}}$$

is only on the x-y plane, therefore the second term of equation (34) can also be written as:

$$T\left(H_{\frac{\beta_s+\beta_e}{2}}(\hat{h}_2)\right) = H_{\frac{\beta_s+\beta_e}{2}} T(\hat{h}_2) \quad (36)$$

Define:

$$\hat{f}_1 = T(\hat{h}_1)$$

$$\hat{f}_2 = T(\hat{h}_2) \quad (37)$$

Equation (34) is:

$$\hat{f} = \hat{f}_1 + H_{\frac{\beta_s+\beta_e}{2}}(\hat{f}_2) \quad (38)$$

We simplify $\hat{f}_1$ first, and $\hat{f}_2$ can be done similiary. Let $$p_h^*(u_h, v_h) = \int_{-\infty}^{\infty}\frac{1}{J}\overline{p}(u_h - u, v_h)g(u)du \quad (39)$$

Substitute equations (18) and (21) into (39):

$$p_h^*(u_h, v_h) = \int_{-\infty}^{\infty}\frac{\cos\theta}{\cos\theta_0}\sin\theta_0\frac{1}{J}p_h(u_h - u, v_h)g_0(u)du$$

$$= \int_{-\infty}^{\infty}\frac{D}{\sqrt{(v_h+D)^2 + (u_h-u)^2 + D_h^2}}$$

$$\frac{1}{J}p_h(u_h - u, v_h)g_0(u)du$$

$$= \int_{-\infty}^{\infty}\frac{D}{\sqrt{(v_h+D)^2 + (u_h-u)^2 + D_h^2}}$$

$$p_f\left(\frac{D(u_h-u)}{v_h+D}, -\frac{DD_h}{v_h+D}\right)g_0(u)du$$

According to equation (15), express $p$ as:

$$p_h^*(u_h, v_h) = p_h^*\left(-\frac{u_f}{v_f}D_h, -D\left(\frac{D_h}{v_f}+1\right)\right)$$

$$= \int_{-\infty}^{\infty}\frac{D}{\sqrt{\left(\frac{DD_h}{v_f}\right)^2 + \left(-\frac{u_f}{v_f}D_h - u\right)^2 + D_h^2}}$$

$$p_f\left(u_f + \frac{v_f}{D_h}u, v_f\right)g_0(u)du$$

$$= \int_{-\infty}^{\infty}\frac{D}{\sqrt{\left(\frac{DD_h}{v_f}\right)^2 + \frac{D_h^2}{v_f^2}(u_f-u)^2 + D_h^2}}$$

$$p_f(u_f - u, v_f)g_0\left(-\frac{D_h}{v_f}u\right)\left|\frac{D_h}{v_f}\right|du = \quad (40)$$

$$\int_{-\infty}^{\infty}\frac{D}{\sqrt{(v_f)^2 + (u_f-u)^2 + D^2)}}$$

$$\left(\frac{v_f}{D_h}\right)^2 p_f(u_f - u, v_f)g_0(u)du\bigg|_{\left(\frac{Dv_h}{v_h+D}, -\frac{DD_h}{v_h+D}\right)} \quad (41)$$

Equation (40) results from changing the dummy variable u in the integral to $$-\frac{D_h}{v_f}u,$$

and Equation (41) is due to the fact that $g_0$ is a homogeneous function of order $-2$, i.e. $g_0(ay)=1/a^2 g_0(y)$, $a \in \Re$.

Plug (20), (32) and (33) into $$\left(\frac{Du_h}{v_h+D}, -\frac{DD_h}{v_h+D}\right):$$

$$\frac{Du_h}{v_h+D} = \frac{D(-\sin\beta x_f + \cos\beta y_f)}{\cos\beta x_f + \sin\beta y_f + D} \quad (42)$$

$$= \left(\frac{Dy_f}{x_f+D}\right)_\beta$$

$$-\frac{DD_h}{v_h+D} = \frac{Dz_f}{\cos\beta x_f + \sin\beta y_f + D} \quad (43)$$

$$= \left(\frac{Dz_f}{x_f+D}\right)_\beta$$

For simplicity, we use the subscript $\beta$ for the coordinate transformation of rotation along the $z_f$-axis by $\beta$.

Now, $\hat{f}_1$ can be computed by combining equations (19), (41), (42) and (43):

$$\hat{f}_1(x_f, y_f, z_f) = \left(\frac{D_h}{z_f}\right)^2 \frac{1}{2}\int_{\beta_s}^{\beta_e} p_h^*(u_h, v_h, \beta)d\beta \quad (44)$$

$$= \left(\frac{D_h}{z_f}\right)^2 \frac{1}{2}\int_{\beta_s}^{\beta_e} \int_{-\infty}^{\infty}$$

$$\frac{D}{\sqrt{(v_f)^2 + (u_f-u)^2 + D^2}}$$

$$\left(\frac{v_f}{D_h}\right)^2 p_f(u_f-u, v_f)g_0(u)du \bigg|_{\left(\frac{Dy_f}{x_f+D}, \frac{Dz_f}{x_f+D}\right)_\beta} d\beta$$

$$= \frac{1}{2}\int_{\beta_s}^{\beta_e}\left(\frac{D}{x_f+D}\right)_\beta^2 Q_1\left(\left(\frac{Dy_f}{x_f+D}\right)_\beta, \left(\frac{Dz_f}{x_f+D}\right)_\beta, \beta\right)d\beta$$

where, $Q_1$ is the convolution of the weighted $p_f$ with the ramp filter kernal, as defined in equation (23):

$$Q_1(u_f, v_f, \beta) = \int_{-\infty}^{\infty} \frac{D}{\sqrt{(u_f-u)^2 + v_f^2 + D^2}} p_f(u_f-u, v_f, \beta)g_0(u)du$$

The above formula shows the reconstruction of $\hat{f}_1$ is exactly the same as is given by the FDK algorithm.

In the calculation of $\hat{f}_2$, since the Hilbert transform on the project data is also 1D along the u axis, the same derivation follows, except for the change of convolution kernal, and the second term of equation (34) is $$H_{\frac{\beta_s+\beta_e}{2}}(\hat{f}_2(x_f, y_f, z_f)) = \quad (45)$$

$$H_{\frac{\beta_s+\beta_e}{2}}\left(\frac{1}{2}\int_{\beta_s}^{\beta_e}\left(\frac{D}{x_f+D}\right)_\beta^2 Q_2\left(\left(\frac{Dy_f}{x_f+D}\right)_\beta, \left(\frac{Dz_f}{x_f+D}\right)_\beta, \beta\right)d\beta\right)$$

where, $Q_2$ is derived according to equation (12) or (14), and given in equation (24):

$$Q_2(u_f, v_f, \beta) = \int_{-\infty}^{\infty} \frac{D}{\sqrt{(u_f-u)^2 + v_f^2 + D^2}} p_f(u_f-u, v_f, \beta)g_{hr}(u)du$$

or, $$= \frac{\partial}{\partial u_f}\left(\frac{D}{\sqrt{u_f^2 + v_f^2 + D^2}} p_f(u_f, v_f, \beta)\right)$$

The sum of $\hat{f}_1$ (equation (44)) and $$H_{\frac{\beta_s+\beta_e}{2}}(\hat{f}_2)$$

(equation (45)) is the final reconstruction formula as shown in equation (22), section III.

What is claimed is:

1. A method of reconstructing an image from detected data using an x-ray cone beam through a real object to be imaged to a real planar detector, the x-ray cone beam emanating from a source rotated less than a circle around the object, comprising the steps of:
   a) detecting x-ray data at a plurality of positions of the source in a path of rotation around the object,
   b) weighting the detected x-ray data according to position in the detector,
   c) convolving the weighted x-ray data with a ramp filter kernal and backprojecting the convolved weighted data to form a first reconstructed three dimensional image,
   d) convolving the weighted x-ray data with a ramp filter kernal and a Hilbert kernal and backprojecting the convolved weighted data to form a second reconstructed three dimensional image,
   e) taking a 1D Hilbert transform of the second three dimensional image, and
   f) combining the first reconstructed image and the Hilbert transformed second three dimensional image to form the reconstructed image.

2. The method of claim 1 wherein step c) is a Feldkamp reconstruction of the detected data.

3. The method of claim 1 wherein in steps d) a one dimensional Hilbert transform is employed in the reconstruction algorithm.

4. The method of claim 1 wherein the source is rotated at least 180 degrees plus beam angle.

5. The method of claim 1 wherein detected projection data is not truncated and with no extrapolated data.

6. A method of reconstructing an image from detected data using an x-ray cone beam through a real object to be imaged to a real planar detector, the x-ray cone beam emanating from a source rotated less than a circle around the object, comprising the steps of:

a) detecting x-ray data at a plurality of positions of the source in a path of rotation around the object, b) weighting the detected x-ray data according to position in the detector, c) convolving the weighted x-ray data with a ramp filter kernal and backprojecting the convolved weighted data to form a first reconstructed three dimensional image, d) taking the first derivative of the weighted x-ray data and backprojecting the first derivative weighted x-ray data to form a second reconstructed three dimensional image, e) taking a 1D Hubert transform of the second three dimensional image, and f) combining the first reconstructed image and the Hubert transformed second three dimensional image to form the reconstructed image.

7. A method of reconstructing an image from detected data using an x-ray cone beam through a real object to be imaged to a real planar detector, the x-ray cone beam emanating from a source rotated less than a circle around the object, using a reconstruction algorithm based on the steps of:

a) detecting projection x-ray data at a plurality of positions of the source in the path of rotation around the object, b) from detected projection data at each position, finding equivalent cone beam projection image data from a lower half of the real object on a hypothetical detector below and parallel to a mid-plane through the planar detector, c) converting the equivalent cone beam projection image data for each position into a tilted parallel projection for each position, d) reconstructing a hypothetical object by backprojecting the tilted parallel projections, e) converting the reconstructed hypothetical object back to the real object, f) repeating steps b) through e) for an upper half of the real object, and g) combining the converted real object from steps e) in reconstructing an image of the real object.

8. The method of claim 7 wherein step g) includes combining a reconstruction of a mid-plane from the source through the real object.

9. The method of claim 8 wherein in steps d) a one dimensional Hilbert transform is employed in the reconstruction algorithm.

10. The method of claim 9 wherein the source is rotated at least 180 degrees plus beam angle.

11. The method of claim 10 wherein detected projection data is not truncated and with no extrapolated data.

* * * * *

UNITED STATES PATENT AND TRADEMARK OFFICE
CERTIFICATE OF CORRECTION

| | | |
|---|---|---|
| PATENT NO. | : 7,409,033 B2 | Page 1 of 1 |
| APPLICATION NO. | : 11/557441 | |
| DATED | : August 5, 2008 | |
| INVENTOR(S) | : Zhu et al. | |

It is certified that error appears in the above-identified patent and that said Letters Patent is hereby corrected as shown below:

In the Specification Under Column 1:

• Please replace lines 15-16 with:

-- This invention was made with Government support under contract EB003524 awarded by the National Institutes of Health. The Government has certain rights in this invention. --

Signed and Sealed this

Nineteenth Day of April, 2011

David J. Kappos
*Director of the United States Patent and Trademark Office*